United States Patent
Jan (10) Patent No.: US 9,454,457 B1
(45) Date of Patent: Sep. 27, 2016

(54) SOFTWARE TEST APPARATUS, SOFTWARE TEST METHOD AND COMPUTER READABLE MEDIUM THEREOF

(71) Applicant: Institute For Information Industry, Taipei (TW)

(72) Inventor: Kai-Yuan Jan, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/949,431

(22) Filed: Nov. 23, 2015

(30) Foreign Application Priority Data

Nov. 5, 2015 (TW) .............................. 104136479 A (51) Int. Cl.
G06F 9/44 (2006.01)
G06F 11/36 (2006.01)
G06F 9/445 (2006.01)

(52) U.S. Cl.
CPC ....... *G06F 11/3612* (2013.01); *G06F 11/3664* (2013.01); *G06F 11/3688* (2013.01); *G06F 9/44589* (2013.01); *G06F 11/3684* (2013.01)

(58) Field of Classification Search
CPC ........... G06F 11/3688; G06F 11/3664; G06F 11/3684; G06F 9/44589; G06F 11/3466; G06F 2201/865
See application file for complete search history.

(56) References Cited

U.S. PATENT DOCUMENTS

| | | | |
|---|---|---|---|
| 7,203,882 B2 | 4/2007 | Fine et al. | |
| 7,331,007 B2 | 2/2008 | Fine et al. | |
| 7,779,374 B1* | 8/2010 | Hamid | G06F 11/263 716/136 |
| 8,276,123 B1* | 9/2012 | Deng | G06F 11/368 717/126 |
| 8,468,503 B2* | 6/2013 | Grosse | G06F 17/5081 717/126 |
| 2009/0287963 A1* | 11/2009 | Oglesby | G06F 11/3684 714/38.1 |
| 2011/0016356 A1* | 1/2011 | Artzi | G06F 11/3672 717/131 |
| 2011/0016456 A1* | 1/2011 | Artzi | G06F 11/3684 717/131 |
| 2011/0016457 A1* | 1/2011 | Artzi | G06F 9/4448 717/131 |
| 2011/0067005 A1* | 3/2011 | Bassin | G06F 11/008 717/127 |
| 2012/0030516 A1* | 2/2012 | De Keukelaere | G06F 11/3684 714/38.1 |
| 2012/0233596 A1* | 9/2012 | Adler | G06F 11/3684 717/124 |
| 2012/0254665 A1* | 10/2012 | Pasala | G06F 11/3684 714/33 |

(Continued)

OTHER PUBLICATIONS

Muthusamy et al., "A New Effective Test Case Prioritization for Regression Testing based on Prioritization Algorithm", International Journal of Applied Information Systems (IJAIS)—ISSN: 2249-0868, vol. 6—No. 7, Jan. 2014, pp. 21-26; <http://research.ijais.org/volume6/number7/ijais14-451081.pdf>.*

(Continued)

*Primary Examiner* — Thuy Dao
*Assistant Examiner* — Ben C Wang
(74) *Attorney, Agent, or Firm* — Skaar Ulbrich Macari, P.A.

(57) ABSTRACT

A software test apparatus and a software test method and a computer readable medium thereof are provided. The software test apparatus stores a software testing program, an under-tested code, a plurality of basic test benches and a plurality of candidate test benches. The under-tested code includes a hard-to-detect code and the hard-to-detect code has at least one hard-to-detect section. The software test apparatus runs the software testing program to execute the following operations: parsing the hard-to-detect code to generate a condition-statement tree; based on the basic test benches and the condition-statement tree, using a support vector machine (SVM) to establish a support vector regression (SVR) predictor; and applying the SVR predictor to choose a best candidate test bench from the candidate test benches.

12 Claims, 4 Drawing Sheets

---

S313 Using the best candidate test bench as an input of the under-test code to run the under-test code S315 Determining whether a code coverage rate of the under-test code reaches a required coverage rate

(56) References Cited

U.S. PATENT DOCUMENTS

| | | | | |
|---|---|---|---|---|
| 2013/0290786 | A1* | 10/2013 | Artzi | G06F 11/3676 714/32 |
| 2015/0007140 | A1* | 1/2015 | Boshernitsan | G06F 11/3688 717/124 |
| 2015/0309813 | A1* | 10/2015 | Patel | G06F 8/75 703/22 |
| 2015/0339217 | A1* | 11/2015 | Avgerinos | G06F 11/3688 717/132 |
| 2015/0363295 | A1* | 12/2015 | Gopalakrishnan | G06F 11/3676 717/126 |
| 2015/0363305 | A1* | 12/2015 | Guan | G06F 11/3688 717/132 |

OTHER PUBLICATIONS

Smith et al., "Test Suite Reduction and Prioritization with Call Trees", ACM, ASE'07, Nov. 2007, pp. 539-534; <http://dl.acm.org/citation.cfm?id=1321733&CFID=791376182&CFTOKEN=36932808>.*

Khan et al., "A Code Coverage-Based Test Suite Reduction and Prioritization Framework", IEEE, WICT;14, Dec. 2014, pp. 229-234; <http://ieeexplore.ieee.org/stamp/stamp.jsp?tp=&arnumber=7076910>.*

* cited by examiner

SOFTWARE TEST APPARATUS, SOFTWARE TEST METHOD AND COMPUTER READABLE MEDIUM THEREOF

PRIORITY

This application claims the benefit of priority based on Taiwan Patent Application No. 104136479 filed on Nov. 5, 2015, which is hereby incorporated by reference in its entirety.

FIELD

The present invention relates to a software test apparatus, a software test method and a non-transitory tangible computer readable medium thereof. More particularly, the present invention provides a software test mechanism for testing an under-tested code, which uses a support vector machine (SVM) to establish a support vector regression (SVR) predictor according to a condition-statement tree of a hard-to-detect code of the under-tested code, and then uses the SVR predictor to choose a best candidate test bench from a plurality of candidate test benches so as to improve code coverage of the under-tested code.

BACKGROUND

With the advancement of the computer technology, different problems and demands in people's lives can be solved and satisfied, respectively, by running particular software on various intelligent apparatuses. However, after codes of software have been written, how to perform an overall test on the codes to ensure that the software can operate normally is a quite important issue.

Code coverage is a common measure in current software testing and it describes the proportion of the code that is tested and to which degree the code is tested. Generally speaking, if the content of the code is not complex, then usually the program writer can detect the code on his/her own or determine whether all sections in the code would be executed by inputting simple parameters; however, if the code is relatively complex or the number of functions forming the code is too large, then the program writer usually detects the proportion of the code that is executed and to which degree the code is executed using software which is capable of testing code coverage. Higher code coverage means that the code will be executed as expected and errors are less likely to be generated.

Plenty of testing software based on code coverage rate is available nowadays, and the code test mechanism of most of the testing software is to generate test benches continuously, and use the generated test benches one by one as input parameters of the code to run the code until the code coverage rate reaches an intended value. However, in such a testing mechanism, before the code coverage rate reaches the intended value, a quite large number of test benches may be generated and the operation of executing the code may be repeated for many times, and this is quite time-consuming and most of these generated test benches may have the same effect in improving the code coverage (i.e., using one test bench has the same effect as using several test benches in improving the code coverage).

Accordingly, an urgent need exists in the art to provide a code test mechanism, which can effectively reduce the number of test benches that are used to execute the codes, thereby reducing the software testing time needed for the code coverage rate to reach the intended value.

SUMMARY

The disclosure includes a code test mechanism, which uses a support vector machine (SVM) to learn a plurality of basic test benches and establish a support vector regression (SVR) predictor according to a condition-statement tree of a hard-to-detect code of an under-tested code, and then uses the SVR predictor to choose a best candidate test bench from a plurality of candidate test benches so as to improve code coverage of the under-tested code. Accordingly, as compared to the conventional code test mechanism, more suitable test benches may be chosen in advance before several test benches are used as the input of the code to run the code in the present invention. This reduces the number of test benches used to execute the code, thereby reducing the software testing time needed for the code coverage rate of the code to reach the intended value.

The disclosure includes a software test apparatus, which comprises a storage and a processor. The storage is configured to store a software testing program, an under-tested code, a plurality of basic test benches and a plurality of candidate test benches. The under-tested code comprises a hard-to-detect code, and the hard-to-detect code comprises at least one hard-to-detect section.

The processor is electrically connected to the storage and is configured to run the software testing program to execute the following operations: (a) parsing the hard-to-detect code to generate a condition-statement tree of the hard-to-detect code, the condition-statement tree comprising a plurality of condition-statement nodes and a plurality of statement nodes, each of the at least one hard-to-detect section consisting of a target condition-statement node among the condition-statement nodes and a target statement node among the statement nodes; (b) for the target condition-statement node of each of the at least one hard-to-detect section, using each of the basic test benches as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node; (c) using a support vector machine (SVM) to establish a support vector regression (SVR) predictor according to each of the basic test benches and the first activation count and the second activation count corresponding to the target condition-statement node of each of the at least one hard-to-detect section; (d) for each of the candidate test benches, inputting the candidate test bench into the SVR predicator to obtain a first predicted activation count of the parent condition-statement node and a second predicted activation count of the at least one sibling condition-statement node corresponding to the target condition-statement node of each of the at least one hard-to-detect section; (e) for the target condition-statement node of each of the at least one hard-to-detect section, calculating an activation probability metric corresponding to each of the candidate test benches according to the first activation counts and the second activation counts corresponding to the basic test benches as well as the first predicted activation count and the second predicted activation count corresponding to each of the candidate test benches; and (f) deciding one of the candidate test benches as a best candidate test bench according to the activation probability metrics corresponding to each of the candidate test benches.

Moreover, the disclosure includes a software test method for a software test apparatus. The software test apparatus comprises a storage and a processor. The storage is configured to store a software testing program, an under-tested code, a plurality of basic test benches and a plurality of candidate test benches. The under-tested code comprises a hard-to-detect code, and the hard-to-detect code comprises at least one hard-to-detect section.

The processor is electrically connected to the storage and configured to run the software testing program to execute the software test method, and the software test method comprises the following steps of: (a) parsing the hard-to-detect code to generate a condition-statement tree of the hard-to-detect code, the condition-statement tree comprising a plurality of condition-statement nodes and a plurality of statement nodes, each of the at least one hard-to-detect section consisting of a target condition-statement node among the condition-statement nodes and a target statement node among the statement nodes; (b) for the target condition-statement node of each of the at least one hard-to-detect section, using each of the basic test benches as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node; (c) using a support vector machine (SVM) to establish a support vector regression (SVR) predictor according to each of the basic test benches and the first activation count and the second activation count corresponding to the target condition-statement node of each of the at least one hard-to-detect section; (d) for each of the candidate test benches, inputting the candidate test bench into the SVR predicator to obtain a first predicted activation count of the parent condition-statement node and a second predicted activation count of the at least one sibling condition-statement node corresponding to the target condition-statement node of each of the at least one hard-to-detect section; (e) for the target condition-statement node of each of the at least one hard-to-detect section, calculating an activation probability metric corresponding to each of the candidate test benches according to the first activation counts and the second activation counts corresponding to the basic test benches as well as the first predicted activation count and the second predicted activation count corresponding to each of the candidate test benches; and (f) deciding one of the candidate test benches as a best candidate test bench according to the activation probability metrics corresponding to each of the candidate test benches.

Additionally, the disclosure includes a non-transitory tangible computer readable medium with a software testing program stored therein. When the software testing program is loaded into a software test apparatus, the software testing program is executed to accomplish a software test method. The software test apparatus stores an under-tested code, a plurality of basic test benches and a plurality of candidate test benches. The under-tested code comprises a hard-to-detect code, and the hard-to-detect code comprises at least one hard-to-detect section.

The software test method comprises the following steps of: (a) parsing the hard-to-detect code to generate a condition-statement tree of the hard-to-detect code, the condition-statement tree comprising a plurality of condition-statement nodes and a plurality of statement nodes, each of the at least one hard-to-detect section consisting of a target condition-statement node among the condition-statement nodes and a target statement node among the statement nodes; (b) for the target condition-statement node of each of the at least one hard-to-detect section, using each of the basic test benches as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node; (c) using a support vector machine (SVM) to establish a support vector regression (SVR) predictor according to each of the basic test benches and the first activation count and the second activation count corresponding to the target condition-statement node of each of the at least one hard-to-detect section; (d) for each of the candidate test benches, inputting the candidate test bench into the SVR predicator to obtain a first predicted activation count of the parent condition-statement node and a second predicted activation count of the at least one sibling condition-statement node corresponding to the target condition-statement node of each of the at least one hard-to-detect section; (e) for the target condition-statement node of each of the at least one hard-to-detect section, calculating an activation probability metric corresponding to each of the candidate test benches according to the first activation counts and the second activation counts corresponding to the basic test benches as well as the first predicted activation count and the second predicted activation count corresponding to each of the candidate test benches; and (f) deciding one of the candidate test benches as a best candidate test bench according to the activation probability metrics corresponding to each of the candidate test benches.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. It shall be appreciated that these example embodiments are not intended to limit the present invention to any particular examples, embodiments, environment, applications or implementations described in these example embodiments. Therefore, description of these example embodiments is only for purpose of illustration rather than to limit the present invention, and the scope claimed in this application shall be governed by the claims. Additionally, in the following example embodiments and the attached drawings, elements unrelated to the present invention are omitted from depiction; and dimensional relationships among individual elements in the attached drawings are illustrated only for ease of understanding, but not to limit the actual scale.

Figure 1:
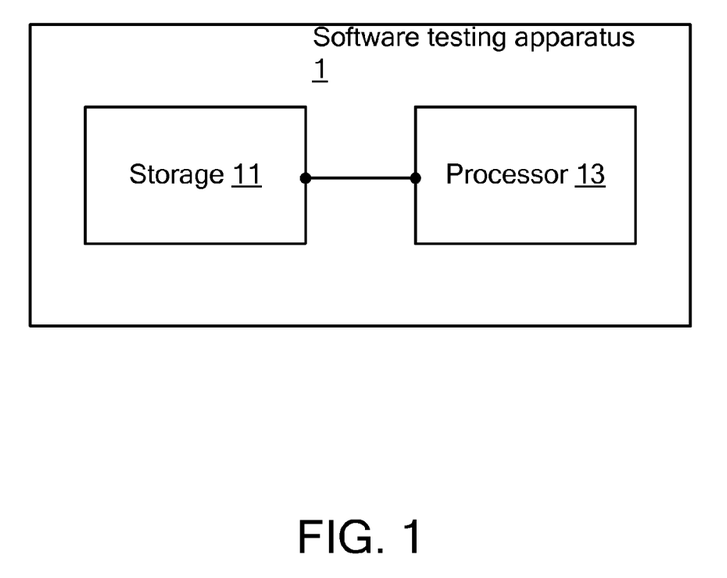
FIG. 1 is a schematic view of a software test apparatus 1 according to a first embodiment of the present invention.
Figure 2:
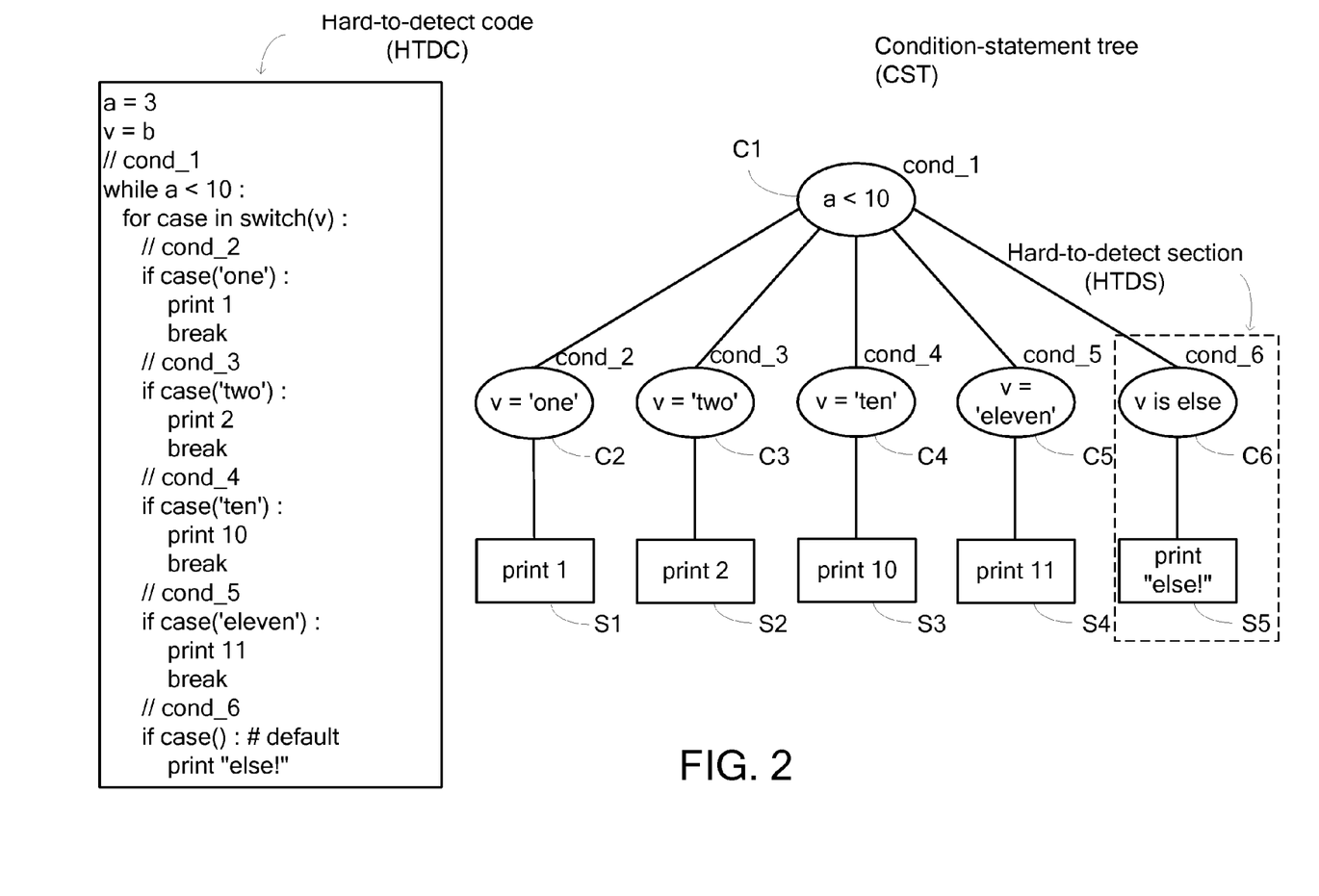
FIG. 2 depicts a hard-to-detect code and a condition-statement tree thereof.
Figure 3:
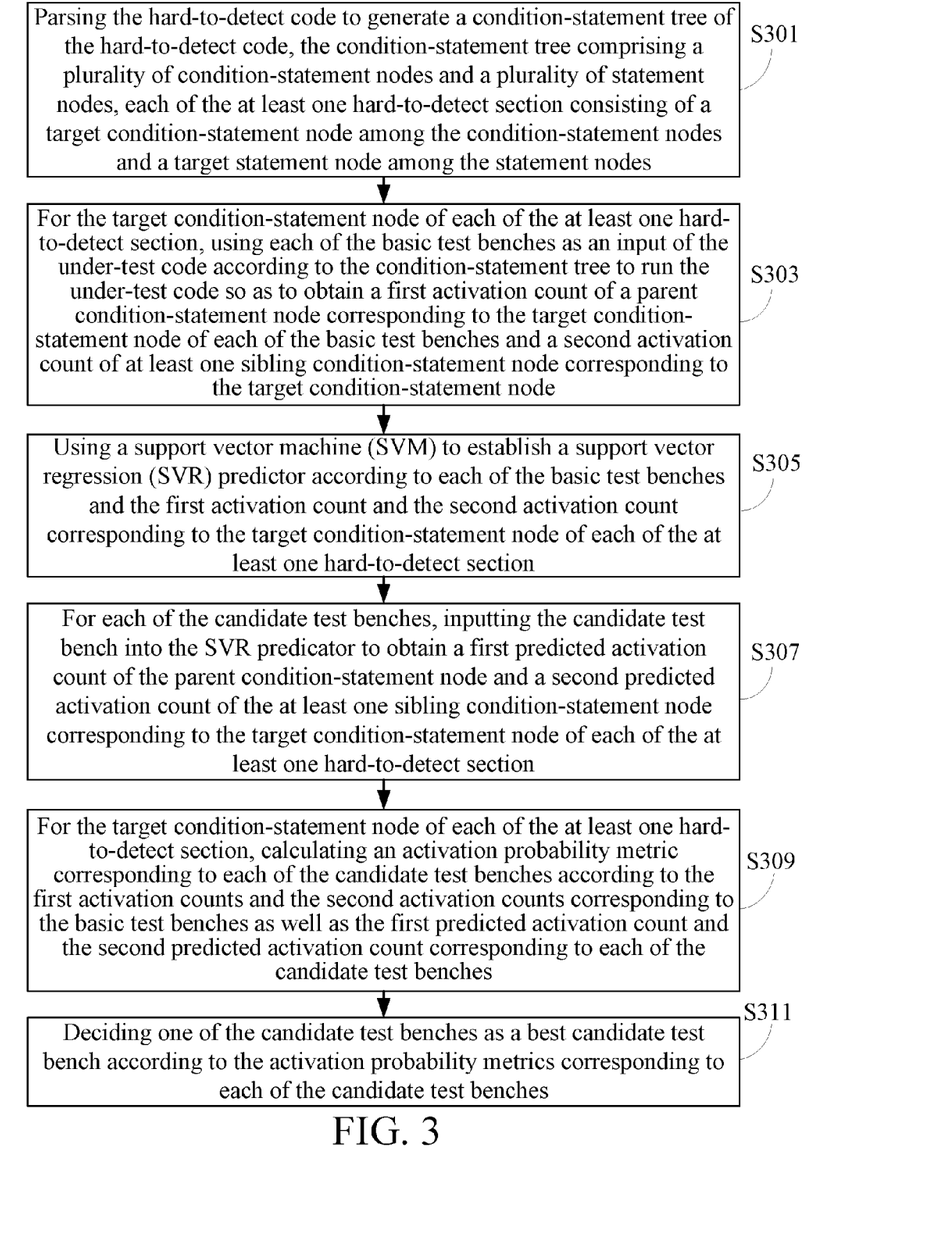
FIG. 3 is a flowchart diagram of a software test method according to the first embodiment of the present invention.

Please refer to FIG. 1, FIG. 2 and FIG. 3 for a first embodiment of the present invention. FIG. 1 is a schematic view of a software test apparatus 1 of the present invention. The software test apparatus 1 comprises a storage 11 and a processor 13. The storage 11 stores a software testing program, an under-tested code, a plurality of basic test benches and a plurality of candidate test benches. The under-tested code comprises a hard-to-detect code, and the hard-to-detect code comprises at least one hard-to-detect section.

In particular, the software testing program of the present invention may operate in cooperation with testing software based on code coverage (e.g., the AQtime testing software developed by the SmartBear company), or may be comprised in testing software based on code coverage. The present invention can find a hard-to-detect code from the under-tested code by using the testing software based on code coverage. It shall be appreciated that, the under-tested code may consist of a plurality of sub-codes, and after the under-tested code is executed by the testing software, it may be analyzed that the code coverage rate of one or more sub-codes is not 100%. Herein, such the sub-code of which the code coverage rate is not 100% is referred to as the hard-to-detect code.

The processor 13 is electrically connected to the storage 11. In addition to the aforesaid testing software, the processor 13 also runs the software testing program of the present invention to execute the following operations (i.e., steps in the flowchart diagram of the software test method depicted in FIG. 3) so as to decide a best candidate test bench among the candidate test benches and try to improve the code coverage of the hard-to-detect code by the best candidate test bench, thereby improving the code coverage of the under-tested code.

First, in step S301, the hard-to-detect code is parsed to generate a condition-statement tree of the hard-to-detect code. The condition-statement tree comprises a plurality of condition-statement nodes and a plurality of statement nodes. Each of the at least one hard-to-detect section consists of a target condition-statement node among the condition-statement nodes and a target statement node among the statement nodes.

For example, FIG. 2 depicts a hard-to-detect code HTDC, written by the Python program language, and a condition-statement tree CST thereof. The hard-to-detect code HTDC comprises six condition statements cond_1, cond_2, cond_3, cond_4, cond_5 and cond_6 and the corresponding statements thereof. By parsing the condition statements of the hard-to-detect code HTDC, the processor 13 can generate the condition-statement tree CST for parsing the hard-to-detect code HTDC. The condition-statement tree CST comprises condition-statement nodes C1, C2, C3, C4, C5 and C6 and statement nodes S1, S2, S3, S4 and S5.

In this exemplary example, the hard-to-detect code HTDC comprises a hard-to-detect section HTDS consisting of the condition-statement node C6 and the statement node S5. For this hard-to-detect section HTDS, the condition-statement node C6 is the target condition-statement node, and the statement node S5 is the target statement node. It shall be appreciated that, although the hard-to-detect code HTDC of this exemplary example only has one hard-to-detect section HTDS, it shall be readily appreciated by those of ordinary skill in the art that any one hard-to-detect code may comprise one or more hard-to-detect sections HTDS, and based on the subsequent description, it shall be readily appreciated by those of ordinary skill in the art that the technology of the present invention can be applied to the hard-to-detect code that comprises one or more hard-to-detect sections.

Next, in step S303, for the target condition-statement node of each of the at least one hard-to-detect section, each of the basic test benches is used as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node. Taking FIG. 2 as an example, the parent condition-statement node of the target condition-statement node C6 is the condition-statement node C1, and the sibling condition-statement nodes of the target condition-statement node C6 are the condition-statement nodes C2, C3, C4 and C5. The first activation count and the second activation count respectively indicate the number of times that the parent condition-statement node C1 is executed and the condition-statement nodes C2, C3, C4 and C5 are executed when the basic test bench is used as the input of the under-tested code to run the under-tested code.

Thereafter, in step S305, a support vector machine (SVM) is used to establish a support vector regression (SVR) predictor according to each of the basic test benches and the first activation count and the second activation count corresponding to the target condition-statement node of each of the at least one hard-to-detect section. In particular, the SVM is a supervised learning mechanism well known to those skilled in the art, and it may learn the known input and output to obtain the SVR predictor between the input and the output thereof. Since how to implement the SVM based on program writing or existing program tools shall be readily appreciated by those of ordinary skill in the art, and thus will not be further described herein.

The step S305 is to use each of the basic test benches as the input and use the first activation count and the second activation count corresponding to the target condition-statement node of each of the at least one hard-to-detect section as the output, and learn the input and the output by the SVM to obtain the SVR predictor between each of the basic test benches and the first activation count and the second activation count corresponding to the target condition-statement node of each of the at least one hard-to-detect section. It shall be appreciated that, the basic test benches may be the same as several test benches that are input into the testing software to find the hard-to-detect code from the under-tested code, or may be further generated by program designers based on these test benches. However, the number of these basic test benches is not intended to limit the present invention.

Moreover, it shall also be appreciated that, as can be known from the above description by those of ordinary skill in the art, before each of the basic test benches is used as the input of the SVM, the characteristic value of each of the basic test benches may need to be converted or retrieved first, and the conversion or retrieval of the characteristic value is dependent on the input characteristics of the under-tested code and the input form of the SVM. For example, if the under-tested code is a code of image analysis software and the test benches are image test benches, then the basic image test benches may first need to be converted into the matrix form before being input into the SVR predictor. Furthermore, if the under-tested code is a code of data analysis software and the test benches are data benches, then the basic data benches may first need to be screened to retrieve data parameters that are more characteristic before being input into the SVR predictor. However, since those skilled in the art of SVM can readily determine whether it is necessary to first process the basic test benches according to the input characteristics of the under-tested code, this will not be further described herein.

Thereafter, in step S307, for each of the candidate test benches, the candidate test bench is input into the SVR predicator to obtain a first predicted activation count of the parent condition-statement node and a second predicted activation count of the at least one sibling condition-statement node corresponding to the target condition-statement node of each of the at least one hard-to-detect section. In other words, by the SVR predictor, the present invention can predict the first predicted activation count of the parent condition-statement node and the second predicted activation count of the at least one sibling condition-statement node corresponding to the target condition-statement node of each of the at least one hard-to-detect section for each of the candidate test benches without using each of the candidate test benches as the input of the under-tested code to run the under-tested code, i.e., as shown by the following formula:

$$\{PPAC_{i,j}, SPAC_{i,j}\} = f_{SVR}(TB_j),$$

where $f_{SVR}(\bullet)$ is an SVR predicator, $TB_j$ is the $j^{th}$ candidate test bench, $PPAC_{i,j}$ is the first predicted activation count corresponding to the target condition-statement node of the $i^{th}$ hard-to-detect section and the $j^{th}$ candidate test bench, and $SPAC_{i,j}$ is the second predicted activation count corresponding to the target condition-statement node of the $i^{th}$ hard-to-detect section and the $j^{th}$ candidate test bench.

Similarly, it shall be appreciated that, as can be known from the above description by those of ordinary skill in the art, before each of the candidate test benches is input into the SVR predicator, the characteristic value of each of the candidate test benches may need to be converted or retrieved first, and the conversion or retrieval of the characteristic value is dependent on the input characteristics of the under-tested code and the input form of the SVM. The processing for the candidate test benches before inputting the candidate test benches into the SVR predicator is the same as the processing for the basic test benches before inputting the basic test benches into the SVM, as can be readily appreciated by those of ordinary skill in the art based on the above description, and thus this will not be further described herein. Moreover, the number of the candidate test benches may also be decided depending on the input characteristics of the under-tested code, or be decided by program designers according to practical experience. However, the number of these candidate test benches is not intended to limit the present invention.

Next, in step S309, for the target condition-statement node of each of the at least one hard-to-detect section, an activation probability metric corresponding to each of the candidate test benches is calculated according to the first activation counts and the second activation counts corresponding to the basic test benches as well as the first predicted activation count and the second predicted activation count corresponding to each of the candidate test benches. For example, the activation probability metric corresponding to each of the candidate test benches may be calculated according to the following formula for the target condition-statement node of each of the at least one hard-to-detect section:

$$APM_{i,j} = \frac{PPAC_{i,j}}{\text{average}(\sum PAC_{i,k})} \times \frac{\text{average}(\sum SAC_{i,k})}{SPAC_{i,j}},$$

where $APM_{i,j}$ is the activation probability metric corresponding to the target condition-statement node of the $i^{th}$ hard-to-detect section and the $j^{th}$ candidate test bench; $PPAC_{i,j}$ is the first predicted activation count corresponding to the target condition-statement node of the $i^{th}$ hard-to-detect section and the $j^{th}$ candidate test bench; $SPAC_{i,j}$ is the second predicted activation count corresponding to the target condition-statement node of the $i^{th}$ hard-to-detect section and the $j^{th}$ candidate test bench; $PAC_{i,k}$ is the first activation count corresponding to the target condition-statement node of the $i^{th}$ hard-to-detect section and the $k^{th}$ basic test bench; and $SAC_{i,k}$ is the second activation count corresponding to the target condition-statement node of the $i^{th}$ hard-to-detect section and the $k^{th}$ basic test bench.

Finally, in step S311, one of the candidate test benches is decided as a best candidate test bench according to the activation probability metrics corresponding to each of the candidate test benches. Generally, the candidate test bench of which the values of the activation probability metrics are larger is more likely to improve the code coverage rate of the hard-to-detect code. Thus, in this embodiment, the processor 13 may calculate a sum value of the activation probability metrics corresponding to each of the candidate test benches so as to decide the candidate test bench corresponding to the maximum sum value as the best candidate test bench. However, in other embodiments, the processor 13 may further calculate an average, a median or a first quartile of the activation probability metrics corresponding to each of the candidate test benches to decide the best candidate test bench.

It shall be appreciated that, the steps of the aforesaid embodiment are illustrated taking one hard-to-detect code as an example; however, it can be readily appreciated by those of ordinary skill in the art that, the aforesaid steps may also be applied to several hard-to-detect codes at the same time to consider the at least one hard-to-detect section in each of the several hard-to-detect codes simultaneously so as to find the best candidate test bench from the candidate test benches, and thus this will not be further described herein.

Additionally, it can be known from the above descriptions that, the software test method described in this embodiment may be implemented by a software testing program having a plurality of codes. The software testing program is stored into a non-transitory tangible computer readable medium. When the software testing program is loaded into an electronic apparatus (e.g., the software test apparatus 1) and installed into the operation system of the electronic apparatus, the software testing program executes the software test method as described in this embodiment. The non-transitory computer readable medium may be an electronic product, such as a read only memory (ROM), a flash memory, a floppy disk, a hard disk, a compact disk (CD), a mobile disk, a magnetic tape, a database accessible to networks, or any other storage media with the same function and well known to those skilled in the art.

Figure 4:
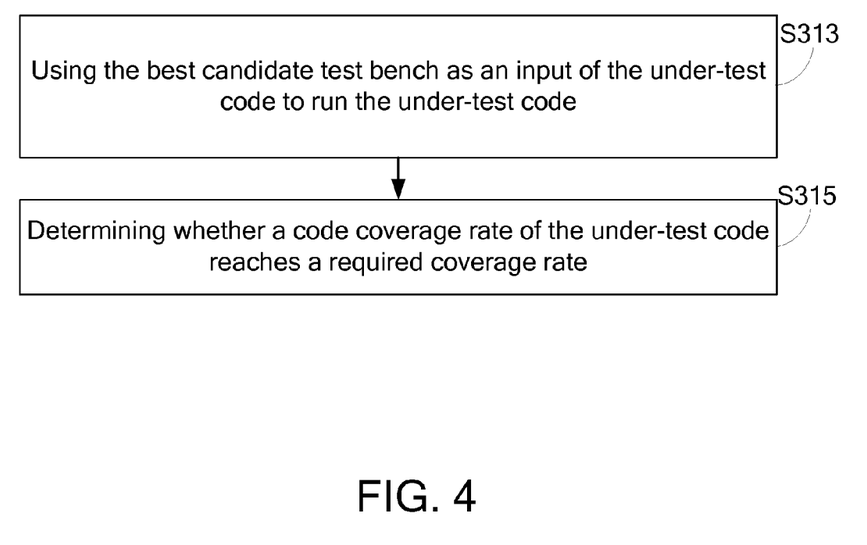
FIG. 4 is a flowchart diagram depicting additional steps of the software test method according to a second embodiment of the present invention.

Please refer to FIG. 1 to FIG. 4 for a second embodiment of the present invention. The second embodiment is an extension of the first embodiment. After the step S309 is executed by the processor 13 to choose the best candidate test bench, the processor further executes other operations, i.e., the software test method of the present invention further comprises steps as shown in FIG. 4. In step S313, the best candidate test bench is used as an input of the under-tested code to run the under-tested code. Thereafter, in step S315, it is determined whether a code coverage rate of the under-tested code reaches a required coverage rate.

Further speaking, after the step S309, the processor 13 uses the chosen best candidate test bench as the input of the under-tested code to run the under-tested code. In this way, the processor 13 obtains a new code coverage rate of the under-tested code based on not only the basic test bench but also the best candidate test bench. Meanwhile, if the newly added best candidate test bench makes the code coverage rate of the under-tested code reach the coverage rate required by testing personnel, then the processor 13 may end the software testing program.

On the contrary, if the newly added best candidate test bench cannot make the code coverage rate of the under-tested code reach the coverage rate required by the testing personnel, then the processor 13 may choose a second-best candidate test bench from the candidate test benches and use the chosen second-best candidate test bench as the input of the under-tested code to run the under-tested code, thereby again obtaining a new code coverage of the under-tested code and again determining whether the new code coverage reaches the coverage rate required by the testing personnel. If the new code coverage rate still does not reach the required coverage rate, then the processor 13 may again choose a third-best candidate test bench from the candidate test benches and use the chosen third-best candidate test bench as the input of the under-tested code to run the under-tested code, thereby again obtaining a new code coverage rate of the under-tested code. It shall be appreciated that, the number of the several preferred candidate test benches chosen from the candidate test benches may be set depending on requirements of the testing personnel and is not intended to limit the present invention.

Furthermore, if the newly added best candidate test bench still cannot allow the code coverage rate of the under-tested code to reach the coverage rate required by the testing personnel, then instead of choosing other less preferred candidate test benches from the candidate test benches, the processor 13 may directly discard these candidate test benches which are not the best test benches to additionally generate a new batch of candidate test benches, and again execute the software testing program of the present invention (i.e., the steps shown in FIG. 3) to choose a new best candidate test bench from the new batch of candidate test benches.

According to the above descriptions, the present invention uses an SVM to learn a plurality of basic test benches and establish an SVR predictor according to a condition-statement tree of a hard-to-detect code of the under-tested code, and then uses the SVR predictor to choose a best candidate test bench from a plurality of candidate test benches before using the best candidate test bench as the input of the under-tested code to run the under-tested code so as to obtain a new code coverage rate of the under-tested code. Accordingly, as compared to the conventional code testing mechanism, more suitable test benches may be chosen in advance from several test benches in the present invention to reduce the number of test benches used to execute the code, thereby reducing the software testing time needed for the code coverage rate to reach the intended value.

The above disclosure is related to the detailed technical contents and inventive features thereof. People skilled in this field may proceed with a variety of modifications and replacements based on the disclosures and suggestions of the invention as described without departing from the charac- teristics thereof. Nevertheless, although such modifications and replacements are not fully disclosed in the above descriptions, they have substantially been covered in the following claims as appended.

The invention claimed is:

1. A software test method for a software test apparatus, the software test apparatus comprising a storage and a processor, the storage being configured to store a software testing program, an under-tested code, a plurality of basic test benches and a plurality of candidate test benches, the under-tested code comprising a hard-to-detect code, and the hard-to-detect code comprising at least one hard-to-detect section, the processor being electrically connected to the storage and configured to run the software testing program to execute the software test method, the software test method comprising:
   (a) parsing the hard-to-detect code to generate a condition-statement tree of the hard-to-detect code, the condition-statement tree comprising a plurality of condition-statement nodes and a plurality of statement nodes, each of the at least one hard-to-detect section consisting of a target condition-statement node among the condition-statement nodes and a target statement node among the statement nodes;
   (b) for the target condition-statement node of each of the at least one hard-to-detect section, using each of the basic test benches as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node;
   (c) using a support vector machine (SVM) to establish a support vector regression (SVR) predictor according to each of the basic test benches and the first activation count and the second activation count corresponding to the target condition-statement node of each of the at least one hard-to-detect section;
   (d) for each of the candidate test benches, inputting the candidate test bench into the SVR predicator to obtain a first predicted activation count of the parent condition-statement node and a second predicted activation count of the at least one sibling condition-statement node corresponding to the target condition-statement node of each of the at least one hard-to-detect section;
   (e) for the target condition-statement node of each of the at least one hard-to-detect section, calculating an activation probability metric corresponding to each of the candidate test benches according to the first activation counts and the second activation counts corresponding to the basic test benches as well as the first predicted activation count and the second predicted activation count corresponding to each of the candidate test benches; and
   (f) deciding one of the candidate test benches as a best candidate test bench according to the activation probability metrics corresponding to each of the candidate test benches.

2. The software test method of claim 1, wherein in the step (e), the activation probability metric corresponding to each of the candidate test benches is calculated according to the following formula for the target condition-statement node of each of the at least one hard-to-detect section:

$$APM_{i,j} = \frac{PPAC_{i,j}}{\text{average}(\sum PAC_{i,k})} \times \frac{\text{average}(\sum SAC_{i,k})}{SPAC_{i,j}}$$

where $APM_{i,j}$ is the activation probability metric corresponding to the target condition-statement node of the $i^{th}$ hard-to-detect section and the $j^{th}$ candidate test bench; $PPAC_{i,j}$ is the first predicted activation count corresponding to the target condition-statement node of the $i^{th}$ hard-to-detect section and the $j^{th}$ candidate test bench; $SPAC_{i,j}$ is the second predicted activation count corresponding to the target condition-statement node of the $i^{th}$ hard-to-detect section and the $j^{th}$ candidate test bench; $PAC_{i,k}$ is the first activation count corresponding to the target condition-statement node of the $i^{th}$ hard-to-detect section and the $k^{th}$ basic test bench; and $SAC_{i,k}$ is the second activation count corresponding to the target condition-statement node of the $i^{th}$ hard-to-detect section and the $k^{th}$ basic test bench.

3. The software test method of claim 1, wherein the step (f) is to calculate a sum value of the activation probability metrics corresponding to each of the candidate test benches respectively so as to decide the candidate test bench corresponding to the maximum sum value as the best candidate test bench.

4. The software test method of claim 1, further comprising:
(g) using the best candidate test bench as an input of the under-tested code to run the under-tested code; and
(h) determining whether a code coverage rate of the under-tested code reaches a required coverage rate.

5. A software test apparatus, comprising:
a storage having a memory, being configured to store a software testing program, an under-tested code, a plurality of basic test benches and a plurality of candidate test benches, the under-tested code comprising a hard-to-detect code, and the hard-to-detect code comprising at least one hard-to-detect section;
a processor electrically connected to the storage, being configured to run the software testing program to execute the following operations:
(a) parsing the hard-to-detect code to generate a condition-statement tree of the hard-to-detect code, the condition-statement tree comprising a plurality of condition-statement nodes and a plurality of statement nodes, each of the at least one hard-to-detect section consisting of a target condition-statement node among the condition-statement nodes and a target statement node among the statement nodes;
(b) for the target condition-statement node of each of the at least one hard-to-detect section, using each of the basic test benches as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node;
(c) using a support vector machine (SVM) to establish a support vector regression (SVR) predictor according to each of the basic test benches and the first activation count and the second activation count corresponding to the target condition-statement node of each of the at least one hard-to-detect section;
(d) for each of the candidate test benches, inputting the candidate test bench into the SVR predicator to obtain a first predicted activation count of the parent condition-statement node and a second predicted activation count of the at least one sibling condition-statement node corresponding to the target condition-statement node of each of the at least one hard-to-detect section;
(e) for the target condition-statement node of each of the at least one hard-to-detect section, calculating an activation probability metric corresponding to each of the candidate test benches according to the first activation counts and the second activation counts corresponding to the basic test benches and the first predicted activation count and the second predicted activation count corresponding to each of the candidate test benches; and
(f) deciding one of the candidate test benches as a best candidate test bench according to the activation probability metrics corresponding to each of the candidate test benches.

6. The software test apparatus of claim 5, wherein in the operation (e), the activation probability metric corresponding to each of the candidate test benches is calculated according to the following formula for the target condition-statement node of each of the at least one hard-to-detect section:

$$APM_{i,j} = \frac{PPAC_{i,j}}{\text{average}(\sum PAC_{i,k})} \times \frac{\text{average}(\sum SAC_{i,k})}{SPAC_{i,j}}$$

where $APM_{i,j}$ is the activation probability metric corresponding to the target condition-statement node of the $i^{th}$ hard-to-detect section and the $j^{th}$ candidate test bench; $PPAC_{i,j}$ is the first predicted activation count corresponding to the target condition-statement node of the $i^{th}$ hard-to-detect section and the $j^{th}$ candidate test bench; $SPAC_{i,j}$ is the second predicted activation count corresponding to the target condition-statement node of the $i^{th}$ hard-to-detect section and the $j^{th}$ candidate test bench; $PAC_{i,k}$ is the first activation count corresponding to the target condition-statement node of the $i^{th}$ hard-to-detect section and the $k^{th}$ basic test bench; and $SAC_{i,k}$ is the second activation count corresponding to the target condition-statement node of the $i^{th}$ hard-to-detect section and the $k^{th}$ basic test bench.

7. The software test apparatus of claim 5, wherein the operation (f) is to calculate a sum value of the activation probability metrics corresponding to each of the candidate test benches respectively so as to decide the candidate test bench corresponding to the maximum sum value as the best candidate test bench.

8. The software test apparatus of claim 5, wherein the processor further executes the following operations:
(g) using the best candidate test bench as an input of the under-tested code to run the under-tested code; and
(h) determining whether a code coverage rate of the under-tested code reaches a required coverage rate.

9. A non-transitory tangible computer readable medium with a software testing program stored therein, the software testing program being executed to accomplish a software test method after being loaded into a software test apparatus, the software test apparatus storing an under-tested code, a plurality of basic test benches and a plurality of candidate test benches, the under-tested code comprising a hard-todetect code, and the hard-to-detect code comprising at least one hard-to-detect section, the software test method comprising:
- (a) parsing the hard-to-detect code to generate a condition-statement tree of the hard-to-detect code, the condition-statement tree comprising a plurality of condition-statement nodes and a plurality of statement nodes, each of the at least one hard-to-detect section consisting of a target condition-statement node among the condition-statement nodes and a target statement node among the statement nodes;
- (b) for the target condition-statement node of each of the at least one hard-to-detect section, using each of the basic test benches as an input of the under-tested code according to the condition-statement tree to run the under-tested code so as to obtain a first activation count of a parent condition-statement node corresponding to the target condition-statement node of each of the basic test benches and a second activation count of at least one sibling condition-statement node corresponding to the target condition-statement node;
- (c) using a support vector machine (SVM) to establish a support vector regression (SVR) predictor according to each of the basic test benches and the first activation count and the second activation count corresponding to the target condition-statement node of each of the at least one hard-to-detect section;
- (d) for each of the candidate test benches, inputting the candidate test bench into the SVR predicator to obtain a first predicted activation count of the parent condition-statement node and a second predicted activation count of the at least one sibling condition-statement node corresponding to the target condition-statement node of each of the at least one hard-to-detect section;
- (e) for the target condition-statement node of each of the at least one hard-to-detect section, calculating an activation probability metric corresponding to each of the candidate test benches according to the first activation counts and the second activation counts corresponding to the basic test benches as well as the first predicted activation count and the second predicted activation count corresponding to each of the candidate test benches; and
- (f) deciding one of the candidate test benches as a best candidate test bench according to the activation probability metrics corresponding to each of the candidate test benches.

10. The non-transitory tangible computer readable medium of claim 9, wherein in the step (e), the activation probability metric corresponding to each of the candidate test benches is calculated according to the following formula for the target condition-statement node of each of the at least one hard-to-detect section:

$$APM_{i,j} = \frac{PPAC_{i,j}}{\text{average}(\sum PAC_{i,k})} \times \frac{\text{average}(\sum SAC_{i,k})}{SPAC_{i,j}}$$

where $APM_{i,j}$ is the activation probability metric corresponding to the target condition-statement node of the $i^{th}$ hard-to-detect section and the $j^{th}$ candidate test bench; $PPAC_{i,j}$ is the first predicted activation count corresponding to the target condition-statement node of the $i^{th}$ hard-to-detect section and the $j^{th}$ candidate test bench; $SPAC_{i,j}$ is the second predicted activation count corresponding to the target condition-statement node of the $i^{th}$ hard-to-detect section and the $j^{th}$ candidate test bench; $PAC_{i,k}$ is the first activation count corresponding to the target condition-statement node of the $i^{th}$ hard-to-detect section and the $k^{th}$ basic test bench; and $SAC_{i,k}$ is the second activation count corresponding to the target condition-statement node of the $i^{th}$ hard-to-detect section and the $k^{th}$ basic test bench.

11. The non-transitory tangible computer readable medium of claim 9, wherein the step (f) is to calculate a sum value of the activation probability metrics corresponding to each of the candidate test benches respectively so as to decide the candidate test bench corresponding to the maximum sum value as the best candidate test bench.

12. The non-transitory tangible computer readable medium of claim 9, wherein the software test method further comprises:
- (g) using the best candidate test bench as an input of the under-tested code to run the under-tested code; and
- (h) determining whether a code coverage rate of the under-tested code reaches a required coverage rate.

* * * * *